Aug. 6, 1968     S. HEDELIN     3,395,894
VIBRATORS
Filed Sept. 28, 1966

INVENTOR.
S. Hedelin
BY
Richards & Geier
ATTORNEYS

United States Patent Office 3,395,894
Patented Aug. 6, 1968

3,395,894
VIBRATORS
Sven Hedelin, Granitvagen 18C, Uppsala, Sweden
Filed Sept. 28, 1966, Ser. No. 582,657
6 Claims. (Cl. 259—1)

ABSTRACT OF THE DISCLOSURE

A vibrator includes an elongated rotor having at one end a rotor body provided with a conical guiding surface which cooperates with a conical guiding surface of a casing enclosing the rotor. The rotor body carries a counter-weight. A slide bearing is secured to the rotor and is arranged centrally in the casing. The slide bearing is driven by a centrally located shaft which is coupled with another shaft driven by a motor, so that the rotor can carry out simultaneously a rotating and a gyrating movement about the same center. The slide bearing is lubricated by the centrifugal force produced during the rotation of the rotor.

---

This invention relates to a vibrator of the type comprising an elongate, stiff rotor having at one end a rotor body provided with conical guiding surfaces, a casing enclosing said rotor and provided with conical guiding surfaces co-operating with the guiding surface of the rotor body, and one or more counter-weights carried by the rotor body.

One object of the invention is to improve the working properties of such vibrators, in which one end of the rotor is mounted in the enclosing casing and its other end is fitted into a weight rolling on a race that is connected with the casing, and in which the rotor describes a planetary rolling movement. Normally, this planetary movement greatly increases the frequency because the oscillatory motion of the rotor around the axis of the casing will be faster than the rotary motion around its own axis. The tilting movement of the rotor or the conical pendulum has so far often been made possible by using articulated mounting through a ball bearing.

Simultaneously with the rotary movement the articulated bearing must in this case be able to perform also a tilting movement of mostly a very high frequency, which is caused by the oscillation of the shaft or the inner bearing ring, and it must also be able to resist axial as well as radial forces.

The performance of all these functions must involve very great strains on a self-aligning ball bearing of chiefly conventional design. So for instance, the tilting movement means that balls as well as ball cage are, as a rule, subjected to great accelerations and retardations. Through the simultaneous tilting and rotation around the bearing center the movement of these elements will become S-shaped, the balls tending towards both knocking and gliding against the ball cage with increased wear as a result. In a normal ball bearing a certain slipping combined with an impact effect will also occur at the contact surfaces between balls and ball races due to the tilting movement, since the balls are normally running in tracks, and this will also increase the wear. Furthermore, the impacts against ball cage, balls and ball races will involve a risk of material fatigue and thus of breaks. These inconveniences will, besides, restrict the deviation of the pendulum as well as its frequency and thus also the effect of the vibrator, i.e. of its efficiency.

An object of this invention is to eliminate these drawbacks and to highly improve the applicability of this type of vibrator. According to this invention, the other end of the rotor is provided with or fastened to a slide bearing the bearing cup (or cups) having at least one aperture so arranged that a lubricating fluid pressed in from a central lubrication point by the centrifugal force caused through the rotation of the rotor body is brought to circulate around the bearing and to pass said apertures, thereby ensuring the necessary lubrication. Furthermore, a shaft is centrally connected with said slide bearing and connected via a coupling with a shaft driven by a motor, and the guiding surface of the casing is spaced somewhat from the guiding surface of the rotor body.

It is thus very important that the articulated bearing should be adapted to suit the actual operating conditions, by way of example by reducing the loads and by making the bearing more capable of resisting the actual or remaining loads.

The major part of the radial forces acting on the bearing can be eliminated, and theoretically they can be completely eliminated, and this is also practically the case in normal operation.

Thus, the radical forces being of very little importance in normal operation, only axial forces remain to deal with. Accordingly, it should be possible to use a bearing of a very simple design to a certain degree more in the form of an articulation than of a conventional bearing.

In view of the above, the articulation or bearing can be designed as a ball with a spherical bearing cup completely or partly enclosing it, and is hereinafter called a spherical slide bearing.

The invention is described in detail in the following description, reference being made to the accompanying drawing which shows some preferred embodiments by way of example.

Figure 1:
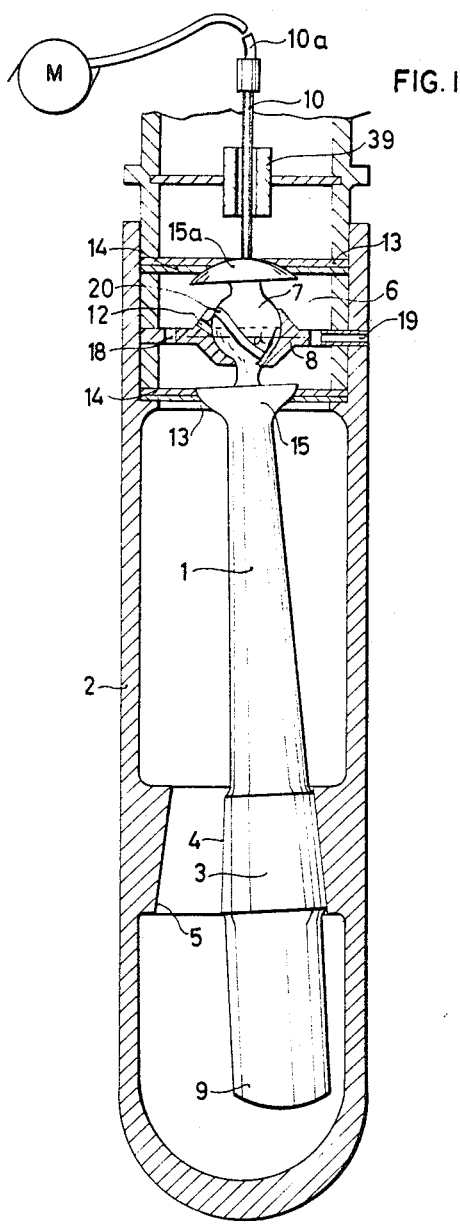
FIGURE 1 is a section through a vibrator constructed in accordance with the principles of the present invention.

In FIG. 1 of the drawing the rotor is designated by the number 1 and the casing by 2. While rotating, the rotor is thrown outwards by the centrifugal force and the roller surface 4 of the rotor body 3 comes into contact with the roller surface 5 of the casing, on which the rotor will thus be rolling. The rotor will rotate about its own axis as well as oscillate about the center line of the casing, or in other words it will perform a so-called planetary rolling movement. The rotor rotates and oscillates about the center of a spherical slide bearing 6 consisting of a ball 7 and a correspondingly shaped spherical bearing cup 8, which is united with the outer casing of the rotor and at least partly encloses the ball 7. During the rotation centrifugal forces are acting on the rotor, substantially perpendicularly to it, namely, to the longitudinal direction of the vibrator. These centrifugal forces would involve great radial strain on the bearing if the rotor were not balanced by means of a member (or several members) 9, hereinafter called counterweight (counterweights), which produces, due to the centrifugal forces, a moment on the rotor so that the radial reaction forces on the bearing are reduced or entirely eliminated. The rotor is driven by a motor from which the motion is transmitted in conventional manner by means of a flexible shaft 10 in the examples here shown. Of course, the motion may also be transmitted directly or in other ways.

Since the rotor or rotor body in this type of vibrator constitutes a so-called conical pendulum, it follows that also the roller surface of the casing and the rotor must be conical. The two roller surfaces 4 and 5 are located on the envelope surfaces of two cones, normally with a common point, situated in the center of the tilting motion.

Thus, as the force acting on the rotor from the roller surface 5 of the casing is obliquely directed, an axial force is produced that has to be carried by the bearing. The rotor body 3 can roll in known manner either on the outside of the roller surface of the casing that consists of a pivot paralleling the casing center, or on its inside as shown in FIG. 1, as is mostly the case.

The spherical slide bearing 6 is constructed so as to absorb the said axial force in the best possible way. In the embodiment shown in FIG. 1 with the rotor body 3 rolling on the inside of the roller surface 5 of the casing an axial force directed from the bearing toward the rotor body is acting on the bearing. If the rotor body rolls on the outside of the roller surface of the casing, the axial force will be oppositely directed. The bearing cup 8 must protrude sufficiently far out, calculated from the bearing center, in the direction of action of the axial force. In this way the angle $\alpha$ will be so large that the bearing can better take up the axial force.

Because of the rotary motion and also the tilting motion frictional forces will act upon the ball or body 7. To reduce the moment of these forces as far as possible it is desirable that the radius of the ball should be as small as possible, whereby also the loss of power will become small. If a pure liquid friction is assumed, the sliding surface covered by lubricant will be also small so that the frictional forces caused by the viscosity of the lubricant will have rather small values. This further proves the advantage gained by using a bearing of small dimensions. As a suitable value it can be assumed that the largest mean diameter of any slide surface of the bearing with inside rolling should not be larger than the mean diameter of the roller surface of the rotor.

In the above statement it has been assumed that the surface load is not so great that the lubricant layer could be forced away to a too high degree, with a too high dry friction as a result. Thus, the advantage with a small bearing depends on the presence of only small forces. This is also the case in this device, wherein the rotor is balanced by means of a counterweight 9 (or several counterweights), so that the radial force in normal operation is of no or very little importance. Besides, the surface load represented by the axial force will be rather small, as the angle $\alpha$ is made large. With a small diameter of the ball 7 and a large angle, i.e. large width on one side of the bearing cup, a corresponding reduction of the axle diameter near the bearing can, however, become necessary on that side in order to provide sufficient place for the bearing cup. This can be done, since thanks to the counterweights the rotor axle is liberated to a great extent from radial forces with consequent bending. The rest of the rotor shaft is made rather thick because it is desired to prevent heavy bending of it, among other things in order to avoid detrimental oscillatory motion. For this reason, the rotor shaft is made rigid.

It will appear from the above that it is advantageous to make the bearing dissymmetrical. A still more important reason for doing so is, however, the lubrication. In the final embodiment the bearing is, in fact, a combination of bearing and a complete lubrication pump acting, in principle, exactly in the same way as a centrifugal pump. Accordingly the lubricant will, partly due to the action of the centrifugal force, move from the part of the bearing where the side of the bearing cup is nearest to the center of the rotor axis and towards the opposite part, where the side of the bearing cup is further remote from the center. If this action is insufficient to cause the wanted effect, the lubricant circulation can, however, be correspondingly improved by providing the bearing cup with one or more apertures 12 extending from a point in or near a plane, here called the center plane, which extends through the bearing center at right angles to the center line of the casing or from the bearing half that is not affected by the axial force, namely, the right-hand part of the bearing in FIG. 1. The intention is that lubricant shall be allowed to run through said aperture or apertures in order to increase the centrifugal force and thus the speed of the lubricant. Such apertures 12 may be used to increase the lubricant circulation even when the bearing is symmetric, and be provided with other devices for supply of lubricant. The bearing surfaces on ball and bearing cup may also be provided with grooves for facilitating the circulation of the lubricant.

If such grooves are made helicoidal and e.g. provided in the surface of the ball, the result will be a lubrication that can be said to be a combination of a centrifugal pump and a screw pump. The lubricating oil pump makes it possible to supply the bearing with a suitable lubricant, and a more liquid and less power-absorbing lubricant with low viscosity respectively, than with a conventional, flexible shaft. The lubricant is fed to the bearing through a filling hole 19. To ensure circulation of the lubricant the walls of the bearing cup are provided with apertures 18 through which the oil flows back after passing through the bearing.

Fitted on both sides of the body 7 are sealing disks 15 and 15a, which are connected with the casing via walls 13 and 14. These sealing disks are so shaped that their contour facing off the bearing 6 forms part of a sphere, the center of which coincides with the center of the bearing 6. Thus, said bearing 6 is arranged in a chamber confined by the sealing disks 15, 15a, the walls 13, 14 and the casing 2.

The section of the rotor may of course by varying, e.g. with the rotor shaft tapered toward the bearing 6, or be completely or partly tubular, or it may consist of several different parts and of different materials, for instance cast iron. The rotor including the rotor shaft 1 and the counter-weights, the sealing disks 15, 15a, the bearing body 7 and the shaft portion 10 may be made in one piece. The race 4 or the races 4, 5 on the rotor and on the casing respectively as well as the slide surfaces of the bearing may be made detachable. It is necessary to provide for easy conduction of heat from the roller surfaces.

Besides possessing the above-mentioned advantages, the spherical slide bearing is also better suited to take up impulsive forces as well as other forces of more or less exceptional nature. Impulsive forces arise for instance when the vibrator contacts solid objects such as reinforcing iron, concrete moulds etc. in unintended manner as will of course happen quite frequently. The vibrator casing will in such cases produce an impact or rather a whole series of impacts against the solid object, thereby often causing a disturbance of the motion of all vibrator parts with consequent transmission of reaction forces from the impacts also to the bearing. It is well known, however, that ball bearings of conventional type are not well suited to absorb impulsive forces, and this is especially so when some of the balls absorb both impulsive forces of more or less undefined direction and normal axial forces. Although ball bearings have been the bearing type mostly used in rod vibrators, balls are, however, as already mentioned, not quite suited to absorb impulsive forces because of the relatively small contact surface between balls and ball races. A suitably constructed slide bearing is, on the other hand, very well suited to absorb such forces, since the bearing cup embraces the bearing ball in every direction at the surfaces partaking in the power transmission, whereas in ball bearings the ball is embraced by the edges of the ball race only in a plane through the shaft centre. Certainly the power is absorbed by several balls in a ball bearing, but then the ball of the slide bearing is very large compared with the balls of a ball bearing, and the bearing cup has been made larger on the side where the axial force is absorbed. In this slide bearing the shaft portion, i.e. the slide bearing ball is, besides, at all the embraced surfaces floating more or less on a lubricant film which partly equalizes the pressures and partly damps the impact by being pressed aside more or less by a suddenly applied force.

From the drive motor the rotary motion is transmitted first by a flexible shaft 10a of conventional type. At a certain distance from the bearing this shaft is connected to another flexible shaft 10, preferably of metallic material (possibly plastic) capable of absorbing the bending strain caused by the oblique seating of the rotor, such as materials with a low coefficient of elasticity. This shaft in turn transmits the motion to the spherical bearing and thus to the rotor shaft. The rotary motion may also be transmitted direct to the bearing etc. by the first-mentioned shaft 10.

Compared with the ball bearing the spherical slide bearing needs considerably less play between the bearing housing and the rotary part because the balls of a ball bearing have a tendency to roll up on the groove edges during an S-shaped movement with risk of being clamped between the inner and outer bearing ring. Accordingly, the spherical slide bearing has the advantage over the ball bearing in that the radial movements allowed by the bearing play are considerably smaller and, in consequence, so are also the fatigue strains on the flexible shaft. Moreover, the radial movements occurring in the spherical slide bearing are soft and not abrupt, due to the liquid film. Furthermore, there should be considered the overcritical speed for the flexible shaft, as the minimum speed is approx. 9–10,000 r.p.m. which means that according to known principles for critical speeds the metallic, flexible shaft 10 should be as thin as possible in order to reduce the bending strain on this shaft. Accordingly, it is preferred to provide the shaft 10 with a tubular guide 39 which prevents too large a bending of the shaft when the critical speed is passed at starting and stopping.

In view of the above, the combination of a spherical slide bearing and a flexible shaft involves special advantages for the strength of the flexible shaft or shafts, and this is of great importance as these shafts have proved to be the weakest part in this type of vibrator.

Figure 2:
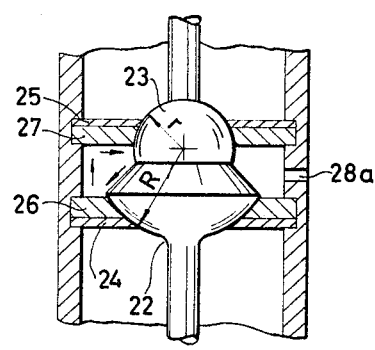
FIGURE 2 is a partial sectional view showing a somewhat different construction.

FIG. 2 shows that satisfactory lubricant circulation can be obtained with an asymmetric bearing and that sealing can be obtained directly against the spherical parts of the bearing. The bearing consists of two bodies 22 and 23 with spherical bearing surfaces. The bodies 22 and 23 oscillate about a common center with the radii R, and r respectively. The body 22 has larger surfaces than the body 23, so that lubricant supplied through an aperture 28a will circulate in the direction indicated by the arrows. Resting against the spherical surfaces of the body 22 are seals 24 and bearing braces 26. Seals 25 and bearing braces 27 are resting in similar manner against the body 23.

Figure 3:
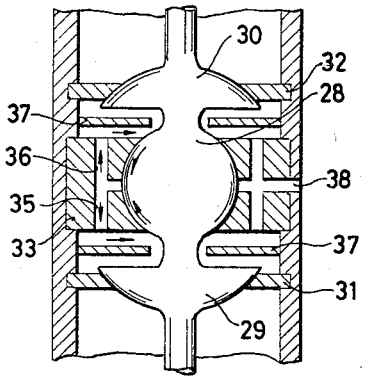
FIGURE 3 is a partial sectional view showing yet another construction.

FIG. 3 shows a further possible embodiment of a spherical bearing, corresponding in certain respects to the example shown in FIG. 1, but differing from it in that it is symmetrically mounted. The bearing consists of a spherical body 28 having on either side sealing disks 29, and 30 respectively, as well as fixed seals 31 and 32, which are connected with the casing. A bearing cup symmetrically embracing the body 28 and designated by 33 is provided with grooves 35, 36 for lubricant circulation. Fixed guide ribs 37 extending from the casing toward the vibrator center are provided to improve the lubrication. During rotation of the rotor body the lubricant moves from the smaller diameter at the axis of the spherical bearing and back in the direction of the arrows. A filling hole for lubricating oil is designated by the number 38.

This invention has several advantages over other vibrators. In some vibrators the oscillation of the rotor is made possible by using a flexible rotor shaft. In such a vibrator the rotor shaft is exposed to high fatigue strains. Besides, its rotor body is not fully mechanically controlled, since the flexible rotor shaft can assume various positions, e.g. when the slope of the roller surfaces is not exactly correct or when the roller surfaces are worn unevenly. This can result in increased strain on the rotor shaft. The flexible rotor shaft is exposed to stresses partly by being bent outward through the action of the centrifugal forces, which are thereby further increased. Also in this type of vibrator, like in a ball bearing type vibrator, a certain limitation of frequency and amplitude takes place. In the vibrator according to this invention the rotor shaft is rigid, or practically rigid, so that these inconveniences are entirely eliminated.

The various parts incorporated in the vibrator of this invention ensure that the vibrator runs geometrically correct to the highest possible degree thanks to the construction of the spherical slide bearing, the rigid rotor shaft which cannot bend or assume detrimental oblique positions, and the small plays.

The manufacture is very uncomplicated and suited for automation and thus for large series.

Of course the construction of parts and the like shown in the drawing and described in the specification may be modified and the parts be combined in various ways within the scope of the invention, which is thus not confined to this construction or to the embodiments shown.

I claim:

1. A vibrator, comprising an elongated stiff rotor having at one end a rotor body provided with a conical guiding surface, a casing enclosing said rotor and provided with a conical guiding surface cooperating with the guiding surface of the rotor body, at least one counter-weight carried by said rotor body, a slide bearing secured to the other end of the rotor and arranged centrally in the casing, means for continuous lubrication of said slide bearing by centrifugal force produced during rotation of the rotor, a shaft centrally connected with said slide bearing, a motor, another shaft driven by said motor and coupled to the first-mentioned shaft, said guiding surface of the casing being spaced from said guiding surface of the rotor body so that the rotor can perform simultaneously a rotating and a gyrating movement about the same center.

2. A vibrator, comprising an elongated stiff rotor having at one end a rotor body provided with a conical guiding surface, a casing enclosing said rotor and provided with a conical guiding surface cooperating with the guiding surface of the rotor body, at least one counter-weight carried by said rotor body, a spherical body constituting a bearing connected with the other end of the rotor and arranged centrally in the casing, a bearing cup having its ends rigidly connected with the inside of said casing, the surfaces of said spherical body sliding against the inner surfaces of said bearing cup, sealing members located on the rotor on either side of said spherical body, means for supplying a lubricant, said bearing having passages for said lubricant which is thrown out through said passages by the centrifugal force produced during rotation of the rotor and seeps back again between said spherical body and the bearing surfaces of the bearing cup, a shaft, a sealing disk centrally connected with said shaft, a coupling connected with said shaft, another shaft connected with said coupling, and a motor driving the second-mentioned shaft, the guiding surface of the casing being spaced from said guiding surface of the rotor body so that the rotor can perform simultaneously a rotating and a gyrating movement about the same center.

3. A vibrator, comprising an elongated stiff rotor having at one end a rotor body provided with a conical guiding surface, a casing enclosing said rotor and provided with a conical guiding surface cooperating with the guiding surface of the rotor body, at least one counter-weight carried by said rotor body, a spherical body constituting a bearing connected with the other end of the rotor and arranged centrally in the casing, a bearing cup having its ends rigidly connected with the inside of said casing, the surfaces of said spherical body sliding against the inner surfaces of said bearing cup, sealing members located on the rotor on either side of said spherical body with wall portions directed laterally to said sealing members, said sealing members and said wall portions forming a housing which encloses said spherical body and said rotor, said sealing members and said spherical body being made in one piece, means for supplying a lubricant, said spherical body having helicoidal grooves ensuring a circulation of lubricant in said bearing by the centrifugal force produced during rotation of the rotor, a shaft, an outer sealing disk, said shaft being connected with the center of said outer sealing disk, a coupling connected with said shaft, another shaft connected with said coupling, and a motor driving the second-mentioned shaft, the guiding surface of the casing being spaced from said guiding surface of the rotor body so that the rotor can perform simultaneously a rotating and a gyrating movement about the same center.

4. A vibrator, comprising an elongated stiff rotor having at one end a rotor body provided with a conical guiding surface, a casing enclosing said rotor and provided with a conical guiding surface cooperating with the guiding surface of the rotor body, at least one counterweight carried by said rotor body, the other end of the rotor constituting a centrally located asymmetrical body serving as a bearing for the rotor, at least one bearing cup forming a part of a sphere, said asymmetrical body having surfaces resting against the inner surfaces of said bearing cup, means forming an aperture for the filling of a lubricant which provides for the necessary lubrication of the bearing surfaces through circulation caused by the centrifugal force produced during rotation of the rotor, sealing members located on either side of said asymmetrical body, said asymmetrical body having an outer portion constituting a shaft, a coupling connected with said shaft, another shaft connected with said coupling, and a motor driving the second-mentioned shaft, the guiding surface of the casing being spaced from said guiding surface of the rotor body so that the rotor can perform simultaneously a rotating and a gyrating movement about the same center.

5. A vibrator as claimed in claim 1, and in which the largest mean diameter of any slide surface in the bearing is not larger than the mean diameter of the roller surface of the rotor.

6. A vibrator as claimed in claim 1, and in which the sides of said bearing are located at different distances from a plane through the center of the rotating and gyrating movements and at right angles to the center line of the outer casing, and are also differently spaced from the center line of the vibrator casing.

References Cited

UNITED STATES PATENTS

| | | | |
|---|---|---|---|
| 2,437,983 | 3/1948 | Wenander | 259—1 |
| 2,844,041 | 7/1958 | Beijer et al. | 74—87 |
| 3,308,671 | 3/1967 | Bodine | 259—1 XR |

WALTER A. SCHEEL, *Primary Examiner.*

J. M. BELL, *Assistant Examiner.*